Patented Mar. 2, 1943

2,312,699

UNITED STATES PATENT OFFICE 2,312,699

TRIAZINYL CARBOXY-ALKYL SULPHIDES AND SALTS THEREOF

Gaetano F. D'Alelio and James W. Underwood, Pittsfield, Mass., assignors to General Electric Company, a corporation of New York No Drawing. Application December 4, 1941, Serial No. 421,682

15 Claims. (Cl. 260—248)

This invention relates to new chemical compounds and more particularly to triazine derivatives. The invention especially is concerned with the production of new and useful triazinyl carboxy-alkyl sulphides and salts thereof.

The chemical compounds of this invention may be represented by the following general formula:

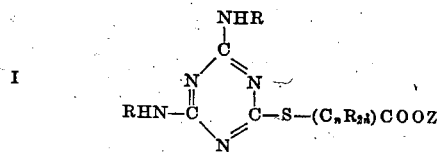

I

In the above formula $n$ represents an integer and is at least 1 and not more than 2, R represents a member of the class consisting of hydrogen and monovalent hydrocarbon and substituted hydrocarbon radicals, more particularly halo-hydrocarbon radicals, and Z represents a member of the class consisting of hydrogen and elements and radicals that can be substituted for the hydrogen atom of a —COOH grouping, more particularly the alkali metals (sodium, potassium, lithium, caesium and rubidium) and the ammonium (—NH$_4$) radical. Thus, when Z stands for hydrogen the triazinyl carboxy-alkyl sulphides of this invention may be represented by the formula

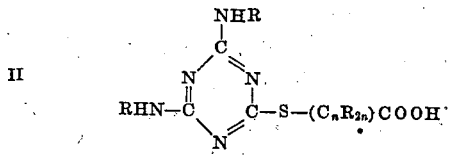

II where $n$ and R have the meanings above given with reference to Formula I. When Z in Formula I is other than hydrogen, the compounds of the invention may be represented by the formula

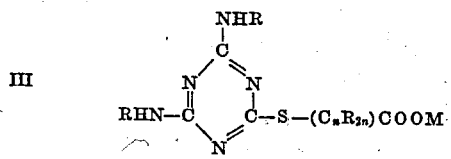

III where M represents a member of the class consisting of elements and radicals that can be substituted for the hydrogen atom of a —COOH grouping, specifically an alkali metal or the ammonium radical, and $n$ and R have the meanings above given with reference to Formula I.

From a consideration of the above formulas it will be seen that, since $n$ represents an integer which is 1 or 2, the linkage of the —(C$_n$R$_{2n}$)COOZ grouping (Formula I) to the sulphur atom in all cases will be alpha or beta to the —COOZ grouping. It also will be observed that linkage of the triazinyl grouping to the sulphur atom is through a carbon atom.

Illustrative examples of radicals that R in the above formulas may represent are: aliphatic (e. g., methyl, ethyl, propyl, isopropyl, allyl, butyl, secondary butyl, isobutyl, butenyl, amyl, methallyl, tertiary butyl, crotyl, ethallyl, heptyl, isoheptyl, octyl, decyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiarybutylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example, a halogen. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl bromotolyl, etc. Preferably R in Formulas I, II and III is hydrogen. However, there also may be produced in accordance with the present invention chemical compounds such, for instance, as those represented by the general formulas:

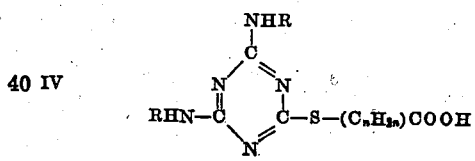

IV and, more particularly,

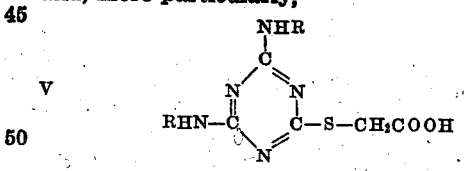

V where $n$ and R have the same meanings as above given with reference to Formula I.

The new compounds of this invention may be used as chemotherapeutic agents and as intermediates in the preparation of derivatives thereof such as ureido, hydrazino, acyl, carbamyl, amidine, etc., derivatives of the individual compound embraced by Formula I. Compounds containing a —COOH grouping may be esterified or amidated; or the hydrogen of the carboxyl grouping may be replaced by a substituent such, for instance, as an ammonium radical or a monovalent metal, e. g., an alkali metal such as sodium, potassium, lithium, etc., thereby to obtain compounds such as represented by Formula III. These new chemical compounds also may be compounded with rubber, both natural and synthetic, to modify the properties of the rubber.

The organic sulphides of the present invention, especially those containing a —COOH grouping, are particularly valuable in the preparation of synthetic resinous compositions. Thus they may be condensed with, for instance, aldehydes, including polymeric aldehydes and aldehyde-addition products, to yield condensation products of particular utility in the plastics and coating arts. Our new compounds containing a —COOH grouping are especially useful when intercondensed with amidogen-aldehyde (e. g., urea-formaldehyde, melamine-formaldehyde, etc.) partial condensation products to effect or to accelerate the conversion of such partial condensation products from a soluble, fusible state to a cured or insoluble and infusible state. Condensation products of these new organic sulphides with aldehydes are more fully described and claimed in our copending application Serial No. 431,540, filed February 19, 1942, and assigned to the same assignee as the present invention.

Various methods may be employed to produce the chemical compounds of this invention. We prefer to prepare them by effecting reaction, in the presence of a hydrohalide acceptor, between a diamino [(—NHR)₂] mercapto symmetrical triazine (s-triazine) and a halo-alkyl monobasic acid or a water-soluble salt of such an acid, e. g., an ammonium salt or an alkali-metal salt. We prefer to use an alkali-metal salt, for instance the sodium or potassium salt, of a halo-alkyl monobasic acid. When a salt of the acid is used, there is first produced a salt (for example, an ammonium or an alkali-metal salt depending upon the particular starting reactant) of the diamino s-triazinyl carboxy-alkyl sulphide. The carboxy derivative is obtained by treating this salt with hydrochloric, hydrobromic, sulphuric or other suitable organic or inorganic acid in an amount just sufficient to decompose the salt and to convert the —COOM grouping of the triazine derivative to a —COOH grouping.

Illustrative examples of mercapto diamino s-triazines that may be used, depending upon the particular end-product desired, are:

2-mercapto 4,6-diamino s-triazine (4-mercapto 2,6-diamino s-triazine; 6-mercapto 2,4-diamino) s-triazine
2-mercapto 4,6-di-(methylamino) s-triazine
2-mercapto 4,6-di-(anilino) s-triazine
2-mercapto 4-amino 6-ethylamino s-triazine
2-mercapto 4,6-di-(propylamino) s-triazine
2-mercapto 4-allylamino 6-butylamino s-triazine
2-mercapto 4-isobutylamino 6-cyclopentylamino s-triazine
2-mercapto 4-(3'-butenylamino) 6-isopropylamino s-triazine
2-mercapto 4-pentylamino 6-cyclohexylamino s-triazine
2-mercapto 4-aminoanilino 6-ethylphenylamino s-triazine
2-mercapto 4-cycloheptylamino 6-isopropylphenylamino s-triazine
2-mercapto 4-isopropylanilino 6-phenylpropylamino s-triazine
2-mercapto 4-dichloroanilino 6-chloroethylamino s-triazine
2-mercapto 4-amino 6-bromoethylamino s-triazine
2-mercapto 4-amino 6-methylamino s-triazine
2-mercapto 4-amino 6-benzylamino s-triazine
2-mercapto 4-n-hexylamino 6-xenylamino s-triazine
2-mercapto 4-cyclohexenylamino 6-naphthylamino s-triazine
2-mercapto 4-chlorocyclopentylamino 6-toluido s-triazine
2-mercapto 4-bromotoluido 6-benzylamino s-triazine
2-mercapto 4-phenylchloroethylamino 6-phenethylamino s-triazine
2-mercapto 4-chloroanilino 6-ethylphenylamino s-triazine Illustrative examples of halo-alkyl monobasic acids and water-soluble salts of halo-alkyl monobasic acids that may be employed, depending upon the particular end-product desired, are:

Chloroacetic acid
Bromoacetic acid
Iodoacetic acid
Alpha-chloropropionic acid
Beta-chloropropionic acid
Alpha-bromopropionic acid
Beta-bromopropionic acid
Alpha-iodopropionic acid
Beta-iodopropionic acid
Alpha-chlorobutyric acid
Alpha-chloro isobutyric acid
Beta-chlorobutyric acid
Beta-chloro isobutyric acid
Alpha-bromo isobutyric acid
Phenyl chloroacetic acid
Alpha-chloro pentanoic acid
Beta-chloro pentanoic acid
Beta-iodo pentanoic acid
Alpha-tolyl beta-phenyl beta-chlorobutyric acid
Alpha-benzyl alpha-cyclopentyl beta, beta'-dinaphthyl beta-iodo propionic acid
Alpha-naphthyl beta-chlorophenyl beta-bromo butyric acid and the alkali-metal and ammonium salts of halo-alkyl monobasic acids such as above mentioned by way of illustration, for example the sodium, potassium, lithium, etc., salts of such halo-alkyl monobasic acids.

Various hydrohalide acceptors may be employed. We prefer to use a hydrohalide acceptor that will react with the mercapto triazine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino s-triazine and the halo-alkyl monobasic acid (or water-soluble salt thereof) may be carried out in any suitable manner, but preferably is effected in the presence of a suitable solvent or mixture of solvents. Although various solvents and solvent mixtures may be employed, for economic reasons and because of their eminent suitability we prefer to use water or a mixture of water and alcohol. The reaction may be carried out under a variety of temperature and pressure conditions, for instance at normal or at elevated temperatures and at atmospheric, sub-atmospheric or super-atmospheric pressures.

When the starting reactant is a halo-alkyl monobasic acid, the reaction may be represented by the following general equation:

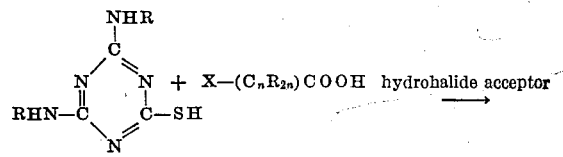

VI

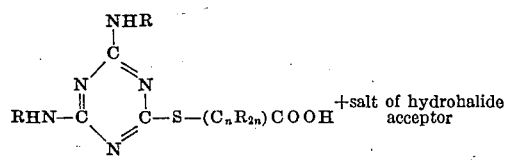

In the above equation X represents halogen, and $n$ and R have the same meanings as given above with reference to Formula I.

When a water-soluble salt, specifically an ammonium salt or an alkali-metal salt, of a halo-alkyl monobasic acid is used as a starting reactant in the preparation of a diamino s-triazinyl carboxy-alkyl sulphide, the following equations illustrate the reaction:

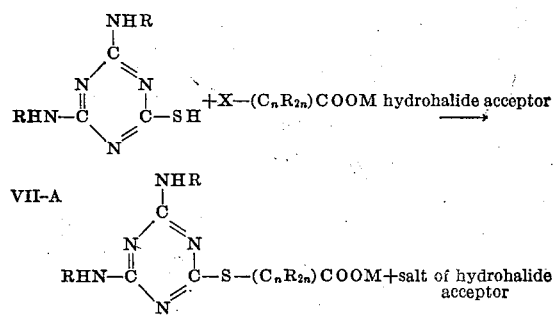

and

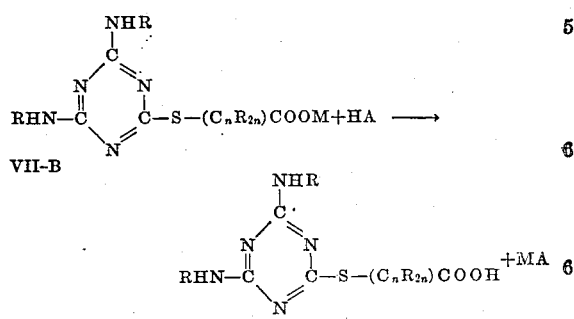

In the above equations (VII-A and VII-B) HA represents an acid capable of converting the —COOM grouping of the compound treated to a —COOH grouping, specifically an inorganic acid (e. g., hydrochloric, hydrobromic, sulphuric, etc.), $n$ and R have the meanings given above with reference to Formula I, and M has the meaning given above with reference to Formula III. MA represents the salt of the acid represented by HA.

The new chemical compounds of this invention also may be prepared by effecting reaction between a halogenated diamino s-triazine (that is, a diamino s-triazine having a halogen atom attached directly to a carbon atom of the triazine nucleus) and a mercapto-alkyl monobasic acid (or a suitable salt thereof), e. g., the alkali-metal salt thereof in the presence of a hydrohalide acceptor. This reaction may be carried out by any suitable means but preferably is effected in the presence of an anhydrous solvent, e. g., alcohol. The other conditions of reaction may be the same as described above with reference to the first-mentioned method of preparation.

In order that those skilled in the art better may understand how the present invention may be carried into effect, the following illustrative examples are given. All parts are by weight.

*Example 1*

This example illustrates the preparation of diamino s-triazinyl carboxy-methyl sulphide.

| | Parts |
|---|---|
| Thioammeline | 143.0 |
| Sodium chloroacetate | 116.5 |
| Sodium hydroxide | 40.0 |
| Water | 500.0 |

The stated amounts of thioammeline and sodium hydroxide were dissolved in the stated amount of water. The sodium chloroacetate was now added and the resulting mixture was heated under reflux at the boiling temperature of the mass for 30 minutes. The reaction mass was allowed to stand for about 16 hours, during which time a crystalline precipitate comprising the sodium salt of diamino s-triazinyl carboxy-methyl sulphide settled out. This precipitate was dissolved by adding more water to the reaction mass, after which hydrochloric acid was added thereto in an amount just sufficient to make the solution faintly acid to litmus. A crystalline precipitate comprising diamino s-triazinyl carboxy-methyl sulphide separated from the acidified solution. This precipitate was filtered off, washed free of soluble impurities such as chlorides, and then dried.

*Example 2*

4,6-di-(methylamino) s-triazinyl-2 carboxy-methyl sulphide, which also may be named 2,6-di-(methylamino) s-triazinyl-4 carboxy-methyl sulphide or 2,4-di-(methylamino) s-triazinyl-6 carboxy-methyl sulphide, is prepared in essentially the same manner as described under Example 1 with the exception that 171 parts of 2-mercapto 4,6-di-(methylamino) s-triazine is used instead of 143 parts thioammeline.

*Example 3*

Diamino s-triazinyl alpha-(carboxy-ethyl) sulphide is prepared in essentially the same manner as described under Example 1 with the exception that 130.5 parts of the sodium salt of alpha-chloropropionic acid (sodium alpha-chloropropionate) is employed instead of 116.5 parts of sodium chloroacetate.

*Example 4*

Diamino s-triazinyl beta-(carboxy-ethyl) sulphide is prepared in essentially the same manner as described under Example 1 with the exception that 130.5 parts of the sodium salt of beta-chloropropionic acid (sodium beta-chloropropionate) is used instead of 116.5 parts of sodium chloroacetate.

Other examples of the chemical compounds of this invention are listed below:

4-amino 6-methylamino s-triazinyl-2 carboxy-methyl sulphide
4,6-di-(ethylamino) s-triazinyl-2 carboxy-methyl sulphide
4,6-di-(anilino) s-triazinyl-2 carboxy-methyl sulphide
4,6-di-(chloroanilino) s-triazinyl-2 carboxy-methyl sulphide
4,6-di-(cyclohexylamino) s-triazinyl-2 carboxy-methyl sulphide
4,6-di-(anilino) s-triazinyl-2 alpha-(carboxy-ethyl) sulphide
4,6-di-(methylamino) s-triazinyl-2 alpha-(carboxy-propyl) sulphide
4-benzylamino 6-phenethylamino s-triazinyl-2 alpha-(alpha-phenyl beta-tolyl carboxy-ethyl) sulphide
4-cyclopentylamino 6-xylidino s-triazinyl-2 beta-(alpha, alpha-dibutyl beta-benzyl carboxy-propyl) sulphide
4-anilino 6-methylamino s-triazinyl-2 carboxy-methyl sulphide
4,6-diamino s-triazinyl-2 beta-(alpha-cyclohexyl carboxy-butyl) sulphide
4-amino 6-naphthylamino s-triazinyl-2 carboxy-methyl sulphide
4,6-di-(naphthylamino) s-triazinyl-2 alpha-(carboxy-ethyl) sulphide
4,6-diamino s-triazinyl-2 alpha-(carboxy-propyl) sulphide
4,6-diamino s-triazinyl-2 beta-(carboxy-propyl) sulphide
4,6-diamino s-triazinyl-2 alpha-(carboxy-butyl) sulphide
4,6-diamino s-triazinyl-2 beta-(carboxy-butyl) sulphide
4,6-diamino s-triazinyl-2 alpha-(carboxy-pentyl) sulphide
4,6-diamino s-triazinyl-2 beta-(carboxy-pentyl) sulphide
4,6-diamino s-triazinyl-2 alpha-(carboxy-hexyl) sulphide
4,6-diamino s-triazinyl-2 beta-(carboxy-hexyl) sulphide
4,6-diamino s-triazinyl-2 beta-(alpha-chlorophenyl carboxy-butyl) sulphide
4,6-diamino s-triazinyl-2 carboxy-(chlorophenyl)-methyl sulphide
4-methylamino 6-toluido s-triazinyl-2 beta-(carboxy-ethyl) sulphide and the ammonium and alkali-metal (e. g., sodium, potassium, etc.) salts of the above-mentioned sulphides.

In a manner similar to that described above with particular reference to the diamino [(—NHR)₂] s-triazinyl carboxy-methyl and carboxy-ethyl sulphides, corresponding derivatives of the asymmetrical and vicinal triazines may be prepared. It also will be understood by those skilled in the art from the foregoing description of the preparation of a triazine monosulphide that similar compounds may be prepared in which two or three sulphur atoms are attached directly to a carbon atom of the triazine nucleus and which have attached to each sulphur atom a —($C_nR_{2n}$)COOZ grouping, where $n$, R and Z have the meanings above given with reference to Formula I.

What we claim as new and desire to secure by Letters Patent of the United States is:

1. Chemical compounds corresponding to the general formula

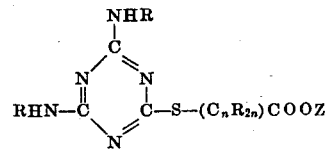

where $n$ is an integer and is at least 1 and not more than 2, R represents a member of the class consisting of hydrogen and monovalent hydrocarbon and halo-hydrocarbon radicals, and Z represents a member of the class consisting of hydrogen, the ammonium radical and alkali metals.

2. Chemical compounds as in claim 1 wherein R represents hydrogen.

3. Chemical compounds corresponding to the general formula

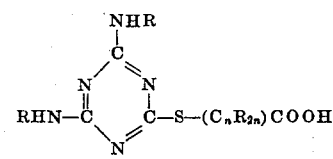

where $n$ is an integer and is at least 1 and not more than 2, and R represents a member of the class consisting of hydrogen and monovalent hydrocarbon and halo-hydrocarbon radicals.

4. Chemical compounds as in claim 3 wherein R represents hydrogen.

5. Chemical compounds corresponding to the general formula

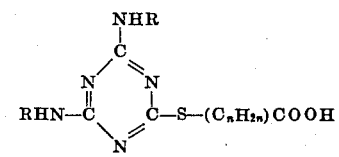

where $n$ is an integer and is at least 1 and not more than 2, and R represents a member of the class consisting of hydrogen and monovalent hydrocarbon and halo-hydrocarbon radicals.

6. Diamino s-triazinyl carboxy-methyl sulphide.

7. A diamino s-triazinyl carboxy-ethyl sulphide.

8. Diamino s-triazinyl alpha-(carboxy-ethyl) sulphide.

9. Diamino s-triazinyl beta-(carboxy-ethyl) sulphide.

10. The method of preparing chemical compounds corresponding to the general formula

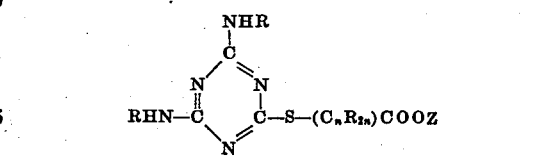

where $n$ is an integer and is at least 1 and not more than 2, R represents a member of the class consisting of hydrogen and monovalent hydrocarbon and halo-hydrocarbon radicals, and Z represents a member of the class consisting of hydrogen, the ammonium radical and alkali metals, said method comprising effecting reaction, in the presence of a hydrohalide acceptor, between a mercapto triazine corresponding to the general formula

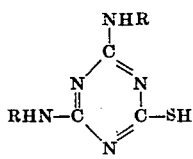

where R has the meaning above given, and (2) a compound corresponding to the general formula

$$X-(C_nR_{2n})COOZ$$

where X represents halogen, and $n$, R and Z have the meanings above given.

11. A method as in claim 10 wherein the hydrohalide acceptor is an alkali-metal hydroxide.

12. The method which includes the step of treating with an inorganic acid a compound corresponding to the general formula.

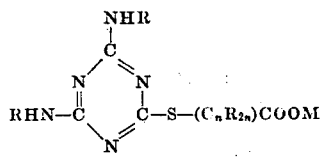

where $n$ is an integer and is at least 1 and not more than 2, R represents a member of the class consisting of hydrogen and monovalent hydrocarbon and halo-hydrocarbon radicals, and M represents a member of the class consisting of the ammonium radical and alkali metals, said acid being employed in an amount just sufficient to convert the —COOM grouping of the said compound to a —COOH grouping.

13. The method of preparing diamino s-triazinyl carboxy-methyl sulphide which comprises effecting reaction, in the presence of a hydrohalide acceptor, between thioammeline and an alkali-metal salt of chloroacetic acid thereby to obtain the alkali-metal salt of diamino s-triazinyl carboxy-methyl sulphide, and treating the said alkali-metal salt with an inorganic acid in an amount just sufficient to convert it to diamino s-triazinyl carboxy-methyl sulphide.

14. A method as in claim 13 wherein the hydrohalide acceptor is an alkali-metal hydroxide.

15. The method of preparing diamino s-triazinyl carboxy-methyl sulphide which comprises effecting reaction, in the presence of sodium hydroxide, between thioammeline and sodium chloroacetate thereby to obtain the sodium salt of diamino s-triazinyl carboxy-methyl sulphide, and treating the said sodium salt with hydrochloric acid in an amount just sufficient to form diamino s-triazinyl carboxy-methyl sulphide.

GAETANO F. D'ALELIO.
JAMES W. UNDERWOOD.